US008593451B2

(12) United States Patent
Kim et al.

(10) Patent No.: US 8,593,451 B2
(45) Date of Patent: Nov. 26, 2013

(54) APPARATUS AND METHOD FOR GENERATING OCTREE BASED 3D MAP

(75) Inventors: Yeon-Ho Kim, Hwaseong-si (KR); Joon-Kee Cho, Yongin-si (KR); Jung-Hyun Han, Seoul (KR); Yonh-hyun Jo, Seoul (KR)

(73) Assignees: Samsung Electronics Co., Ltd., Suwon-Si (KR); Korea University Research and Business Foundation, Seoul (KR)

( * ) Notice: Subject to any disclaimer, the term of this patent is extended or adjusted under 35 U.S.C. 154(b) by 479 days.

(21) Appl. No.: 12/929,682

(22) Filed: Feb. 8, 2011

(65) Prior Publication Data
US 2011/0193859 A1    Aug. 11, 2011

(30) Foreign Application Priority Data
Feb. 9, 2010    (KR) .................. 10-2010-0012091

(51) Int. Cl.
*G06T 15/00*    (2011.01)
(52) U.S. Cl.
USPC ............................. 345/419; 901/46; 901/47
(58) Field of Classification Search
USPC ....................................... 345/419; 901/46, 47
See application file for complete search history.

(56) References Cited

U.S. PATENT DOCUMENTS

| 7,280,434 B2 | 10/2007 | Wang et al. |
| 2010/0121488 A1 | 5/2010 | Lee et al. |

FOREIGN PATENT DOCUMENTS

| JP | 2003-266349 | 9/2003 |
| KR | 10-2005-0095384 | 9/2005 |
| KR | 10-2008-0029239 | 4/2008 |
| KR | 10-2009-0010367 | 1/2009 |
| KR | 10-2009-0092126 | 8/2009 |

OTHER PUBLICATIONS

Shin-Kyu Park et al., "Grid Map based Beacon Position Estimation using the Weighting Ring with the Variable Width," Seoul National University, E-Mail {mugcup0828, pjb0922, bhlee}@snu.ac.kr, Jun. 2007, 1-7 pgs.

*Primary Examiner* — Maurice L McDowell, Jr.
(74) *Attorney, Agent, or Firm* — Staas & Halsey LLP

(57) ABSTRACT

A method of generating a 3D complex octree map. A plurality of points each having 3D location information are detected from a range image. A space having the detected plurality of points is represented using grids. If points in a grid forms a plane, the grid is not subdivided and planar information about the plane is stored. A space not forming a plane is subdivided, thereby enhancing the storage efficiency.

12 Claims, 9 Drawing Sheets

APPARATUS AND METHOD FOR GENERATING OCTREE BASED 3D MAP

CROSS-REFERENCE TO RELATED APPLICATIONS

This application claims the benefit under 35 U.S.C. §119(a) of Korean Patent Application No. 10-2010-0012091, filed on Feb. 9, 2010, the disclosure of which is incorporated by reference in its entirety for all purposes.

BACKGROUND

1. Field

One or more embodiments relate to 3-D graphics for representing an object in 3-D and a robot technology for recognizing a 3-D space.

2. Description of the Related Art

The term "robot" has been generally applied to an autonomous figure having a human form which is equipped with a machine to operate body parts including mechanical limbs to perform functions in a humanlike manner. However, nowadays, the term "robot" can refer to a machine that does not resemble a human being in appearance, though still autonomously performing tasks.

In particular, a mobile robot is desirable in performing tasks in harsh environments or dangerous areas, in place of humans. In addition, a domestic mobile robot, such as a cleaning robot, which autonomously moves in homes, is becoming increasingly common for helping with housework.

In order for the mobile robot to perform tasks while autonomously moving, it is desirable for the mobile robot to recognize the surroundings of the mobile robot. The recognition of the surroundings may be achieved through a three-dimensional (3D) map. There are typically two types of 3D maps. These include a 3D point map in which each part of an object is represented as 3D points, and a 3D grid map in which a space having an object is represented using a grid.

SUMMARY

According to one or more embodiments, there is provided an apparatus generating an octree based three-dimensional (3D) map, the apparatus including a point detection unit configured to detect a plurality of points each having 3D location information from a range image, a grid setting unit configured to represent the plurality of points using at least one first grid, and a grid partitioning unit configured to subdivide the at least one first grid into at least one respective second grid based on a determination of whether respective points positioned in the at least one first grid form a plane.

The grid partitioning unit may determine whether points in a first grid form a plane, store planar information about the plane without subdividing the first grid into at least one second grid, when the determination indicates that the points in the first grid form a plane, and subdivide the first grid into the at least one second grid and stores spatial information about the at least one second grid when the determination indicates that the points in the first grid do not form a plane.

According to one or more embodiments, there is provided a method of generating an octree based three-dimensional (3D) map, the method including acquiring a range image, detecting a plurality of points each having 3D location information from the range image, representing the plurality of points using at least one first grid, determining whether respective points in the at least one first grid form a plane, and storing planar information about the plane when the determination indicates that the respective points in the at least one first grid form a plane, and subdividing the at least one first grid into at least one respective second grid and storing spatial information about the at least one respective second grid when the determination indicates that the respective points in the at least one first grid do not form a plane.

The planar information may include at least one of parameters of a plane equation on the plane, boundary information of the plane, and position coordinates of the respective points forming the plane in the at least one first grid. The spatial information includes at least one of position coordinates of a center of the at least one respective second grid, a size of the at least one second grid, information about a lower grid, and position coordinates of respective points in the at least one second grid.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
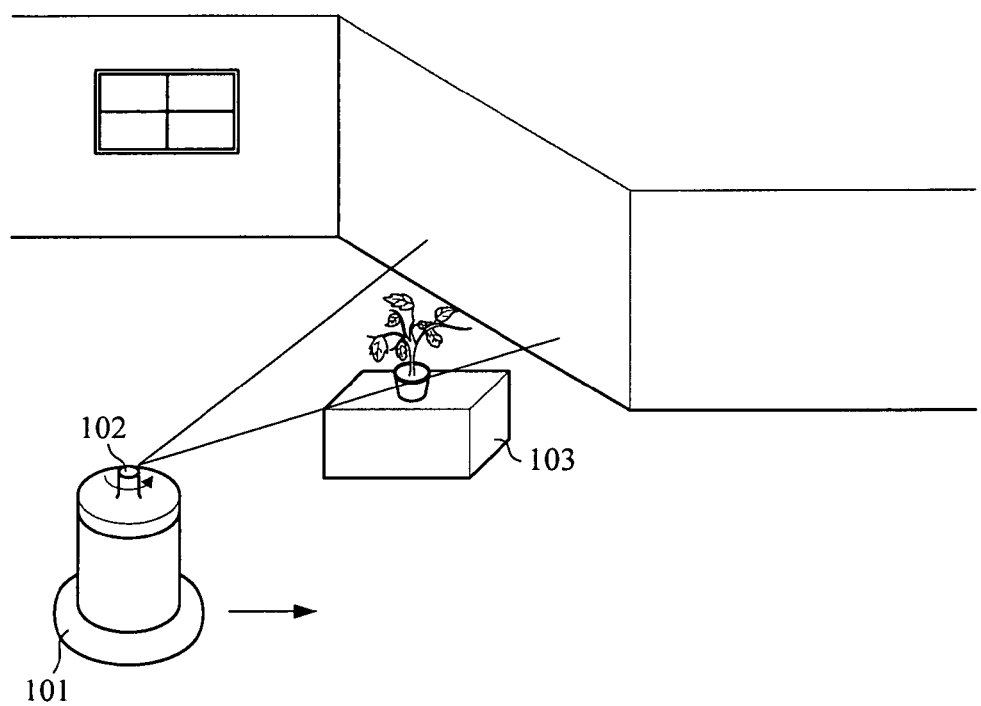
FIG. 1 illustrates a robot, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a robot, according to one or more embodiments.

As illustrated in FIG. 1, a robot 101 generates a map for a work space and performs a predetermined task in the work space based on the generated map. As only an example, the robot 101 may be a mobile cleaning robot.

The robot 101 is equipped with a predetermined sensor 102. The sensor 102 detects information about the surrounding environment of the robot. The robot 101 generates a three-dimensional (3D) map based on the detected information. The sensor 102 may be implemented by a distance sensor or a camera. As only an example where the sensor 102 is a 3D distance sensor, the robot 101 may acquire range data about an object 103 by use of the 3D sensor. As another example where the sensor 102 is a stereo camera, the robot 101 may acquire a range image about the object 103 by use of the stereo camera. However, the sensor 102 is not limited thereto and may be implemented by any other sensor, for example an ultrasonic sensor that acquires information used to generate a map.

The robot 101 generates a 3D complex octree map based on the information obtained from the sensor 102. In an embodiment, the 3D complex octree map is a 3D map.

In order to describe a 3D complex octree map, a general 3D grid map and a simple octree map will be described. A general 3D grid map represents a space by dividing the space using a size-fixed grid. The general 3D grid map is easy to implement but has a low efficiency of storage since even an empty space not having an object still needs to be divided in the general 3D grid map. A simple octree map represents a space using different sizes of grids, that is, a space not having an object is represented using a large grid and a space having an object is represented using a small grid depending on the complexity of the object. The simple octree map offers superior storage efficiency, but is not suitable for representing a planar object such as a wall surface or a plate in a work space.

According to one or more embodiments, a 3D complex octree map is selectively defined such that a space or an object is represented based on a simple octree map while, a portion having a plane is not represented using a grid, but represented using planar information.

Figure 2:
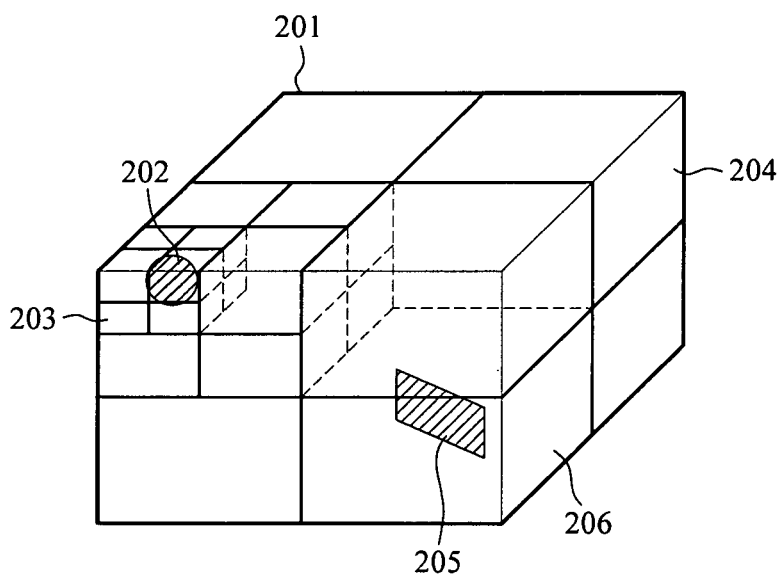
FIG. 2 illustrates a three-dimensional (3D) complex octree map, according to one or more embodiments.

FIG. 2 illustrates a complex octree map, according to one or more embodiments.

As illustrated in FIG. 2, a complex octree map represents a space 201 by dividing the space 201 into a plurality of grids 203 and 204 having different sizes. As only an example, a portion having an object 202 is divided as a unit grid 203 and a portion not having the object 202 is divided as an initial grid 204 larger than the unit grid 203. In an embodiment, in the case of a planar object 205 in a planar shape such as a planer patch, a grid 206 having the planar object 205 is not divided as the unit grid 203 but only information about the planar object 205 is stored and used.

Figure 3:
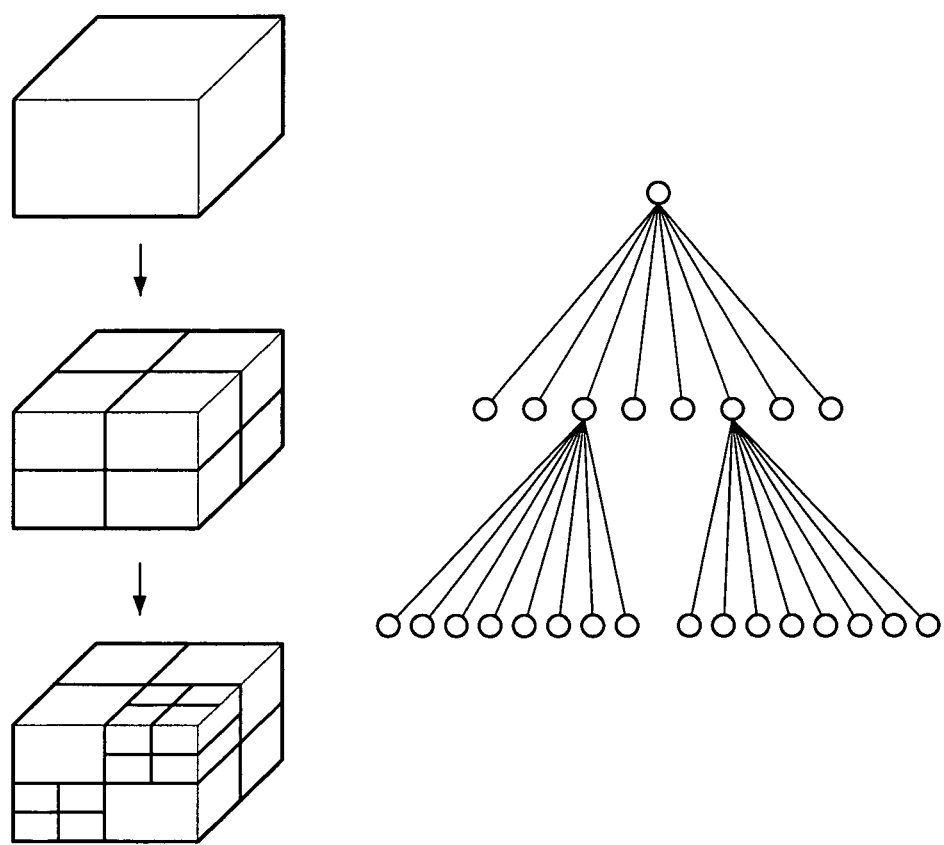
FIG. 3 illustrates a storage architecture of a 3D complex octree map, according to one or more embodiments.

FIG. 3 illustrates a storage architecture of a complex octree map, according to one or more embodiments.

As illustrated in FIG. 3, the complex octree map is stored in a memory in a link architecture. Each node of the link architecture corresponds to a grid and represents a storage of a memory that stores position coordinates of the center of the corresponding grid and an address of a lower grid. The link between nodes represents a relationship between a parent grid and a child grid.

As illustrated in FIGS. 1 to 3, the robot 101 acquires information about a space having the object 103 through the sensor 102, generates a complex octree map illustrated in FIG. 2 to recognize the space based on the acquired information, and stores the generated complex octree map in the link architecture illustrated in FIG. 3.

Figure 4:
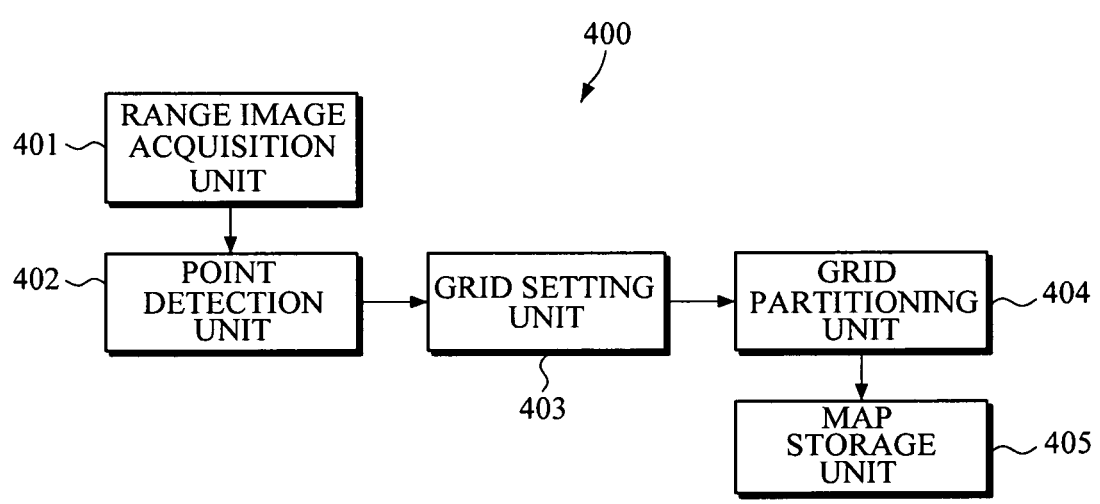
FIG. 4 illustrates an apparatus generating an octree-based 3D map, according to one or more embodiments.

FIG. 4 illustrates an apparatus generating an octree-based 3D map, according to one or more embodiments. An octree-based 3D map generating apparatus 400 may be mounted on the robot 101 or may be a part of the robot 101.

As illustrated in FIG. 4, the octree-based 3D map generating apparatus 400 includes a range image acquisition unit 401, a point detection unit 402, a grid setting unit 403, a grid partitioning unit 404, and a map storage unit 405, for example.

The range image acquisition unit 401 acquires a range image about a work space of the robot 101. As only an example, the range image acquisition unit 401 may acquire range data about a work space through a 3D distance sensor. The range data represents image data of range image data representing each position of an image by hue, brightness, and saturation differently depending on distance in the image.

The range image acquisition unit 401 detects light reflected from an object, converts the detected light into a digital signal and processes the digital signal. In this case, the range image acquisition unit 401 may be provided with an image sensor, such as a complementary metal oxide semiconductor (CMOS) or a charge coupled device (CCD), and an image processing module which receives the output of the image sensor and generates a 3D image.

The point detection unit 402 detects a plurality of points each having 3D location information from the acquired range image. The points may be feature points on a surface or a boundary of an object. In an embodiment, each point has 3D position coordinates.

The grid setting unit 403 represents a space taken by the detected point by use of at least one first grid. The first grid may be provided in the form of a cube including a space having detected points. As only an example, the grid setting unit 403 may represent a work space or a space corresponding to the acquired range image by use of eight first grids. The size of the first grid may be determined depending on the intention of use and the size of the work space.

The grid partitioning unit 404 determines whether the points in the first grid form a plane. For example, the grid partitioning unit 404 sets a plurality of candidates for a plane in the first grid, and determines whether the points in the first grid form a plane, based on the candidates for a plane. The candidates for a plane may be set by applying a plane detection algorithm to range information and position coordinates of each point or by obtaining parameters of a plane equation by use of range information and position coordinates of each point.

In addition, in an embodiment, the grid partitioning unit 404 divides the first grid into one or more second grids which are a sub-grids smaller than the first grid if the points in the first grid do not form a plane, and stores spatial information about each of the second grids in the map storage unit 405.

In addition, in an embodiment, if the points in the first grid form a plane, the grid partitioning unit 404 does not divide the first grid into the one or more second grids and stores information about the points forming the plane and information about the plane in the map storage unit 405.

According to this example, the spatial information stored in the map storage unit 405 may be position coordinates of the center of the grid, the size of the grid, position coordinates of at least one 3-D point and information about a lower grid. The planar information stored in the map storage unit 405 may be parameters of a plane equation, boundary information about a plane or position coordinates of the points forming a plane.

As described above, when representing a predetermined space or object using a plurality of grids, the map generating apparatus 400 divides a portion of the space or object not having a plane into lower grids, and stores information about the plane.

Figure 5A:
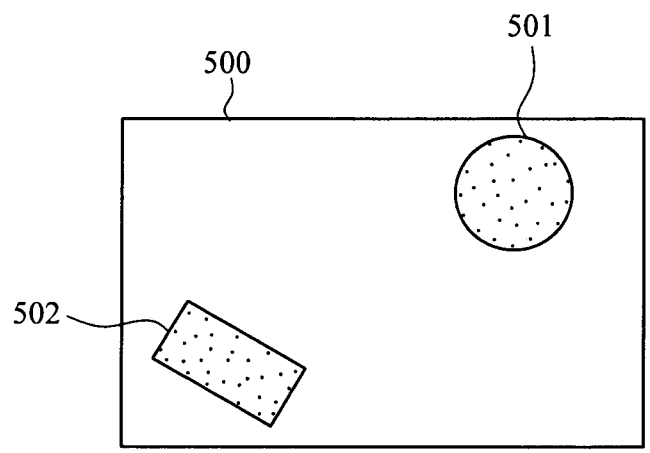
FIGS. 5A and 5D illustrate a process of generating a 3D complex octree map, according to one or more embodiments.
Figure 5B:
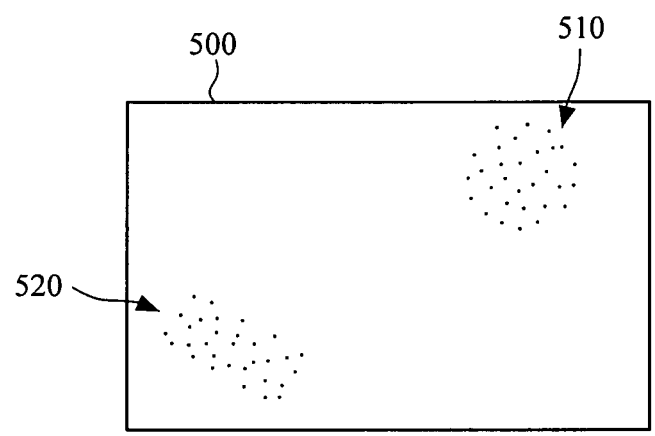
Figure 5C:
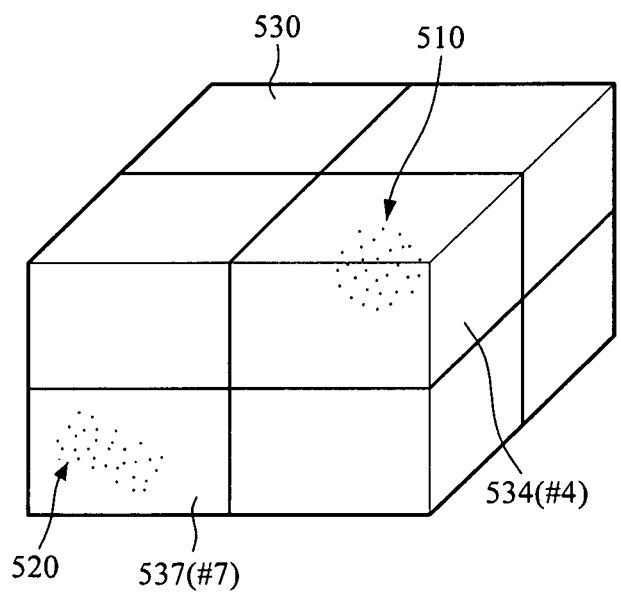
Figure 5D:
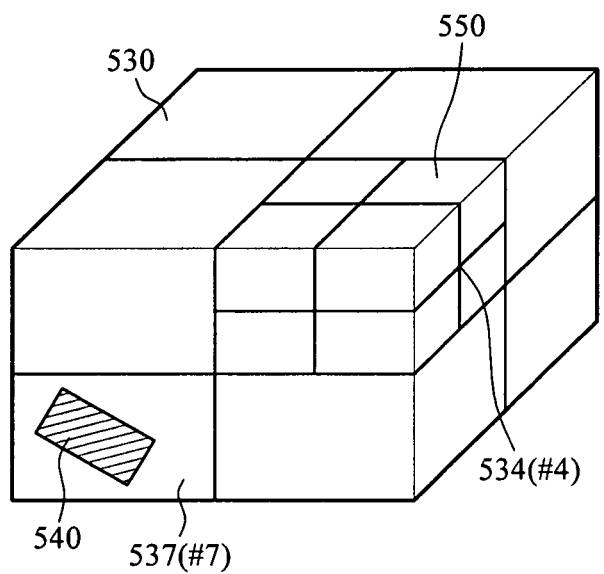

FIGS. 5A and 5D illustrate a process of generating a 3-D complex octree map, according to one or more embodiments.

In FIG. 5A, the range image acquisition unit 401 acquires a range image 500. The range image 500 relates to a work space of the robot 101, in which a spherical object 501 and a planar object 502 are assumed to be present, as only an example. In this case, the planar object 502 may correspond to a wall surface of the work space, for example. The range image 500 may be a range data based image. As only an example, the objects 501 and 502 may be represented by a plurality of points in the image 500, and each point has range information or position coordinates.

In FIG. 5B, the point detection unit 402 detects 3D points from the spherical object 501 and the planar object 502. For example, the spherical object 501 may be represented by detected first points 510 and the planar object 502 may be represented by detected second points 520.

In FIG. 5C, the grid setting unit 403 represents a space having the first points 510 corresponding to the spherical object 501 and the second points 520 corresponding to the planar object 502, by use of an initial grid 530. As only an example, the grid setting unit 403 may represent the space by use of eight initial grids 530. In this case, for example, the first points 510 are included in a fourth initial grid 534 and the second points 520 are included in a seventh initial grid 537.

In FIG. 5C, the grid partitioning unit 403 detects the points forming a plane. That is, the grid partitioning unit 403 detects a grid including a plane among the initial grids 530. As only an example, the grid partitioning unit 403 may detect the seventh initial grid 537 having the second points 520 corresponding to the planar object 502.

In FIG. 5D, the grid partitioning unit 405 does not divide the seventh initial grid 537 having the second points 520 corresponding to the planar object 502, but divides the fourth initial grid 534 having the first points corresponding to the spherical object 501 into sub-grids 550. The grid partitioning unit 405 stores parameters of a plane equation relating to a plane 540 or planar information such as position coordinates of points forming the plane 540. In addition, the grid partitioning unit 405 stores spatial information of the initial grid 530 and the sub-grid 550, such as position coordinates of the center of the initial grid 530 and the sub-grid 550.

In FIG. 5D, the above process of dividing a grid depending on the presence of a plane is applied to the fourth initial grid 534 including eight sub-grids 550, thereby subdividing the fourth initial grid 534.

Alternatively, if points forming a plane and points not forming a plane are present in a predetermined grid, the predetermined grid is regarded as not having a plane and divided into sub-grids. After that, the above processing of dividing a grid depending on the presence of a plane is applied to the sub-grids.

Hereinafter, though a method of generating an octree-based 3D map will be described with reference to FIG. 6 in conjunction with FIGS. 5A to 5D, embodiments are not intended to be limited to the same, and alternate embodiments are available.

Figure 6:
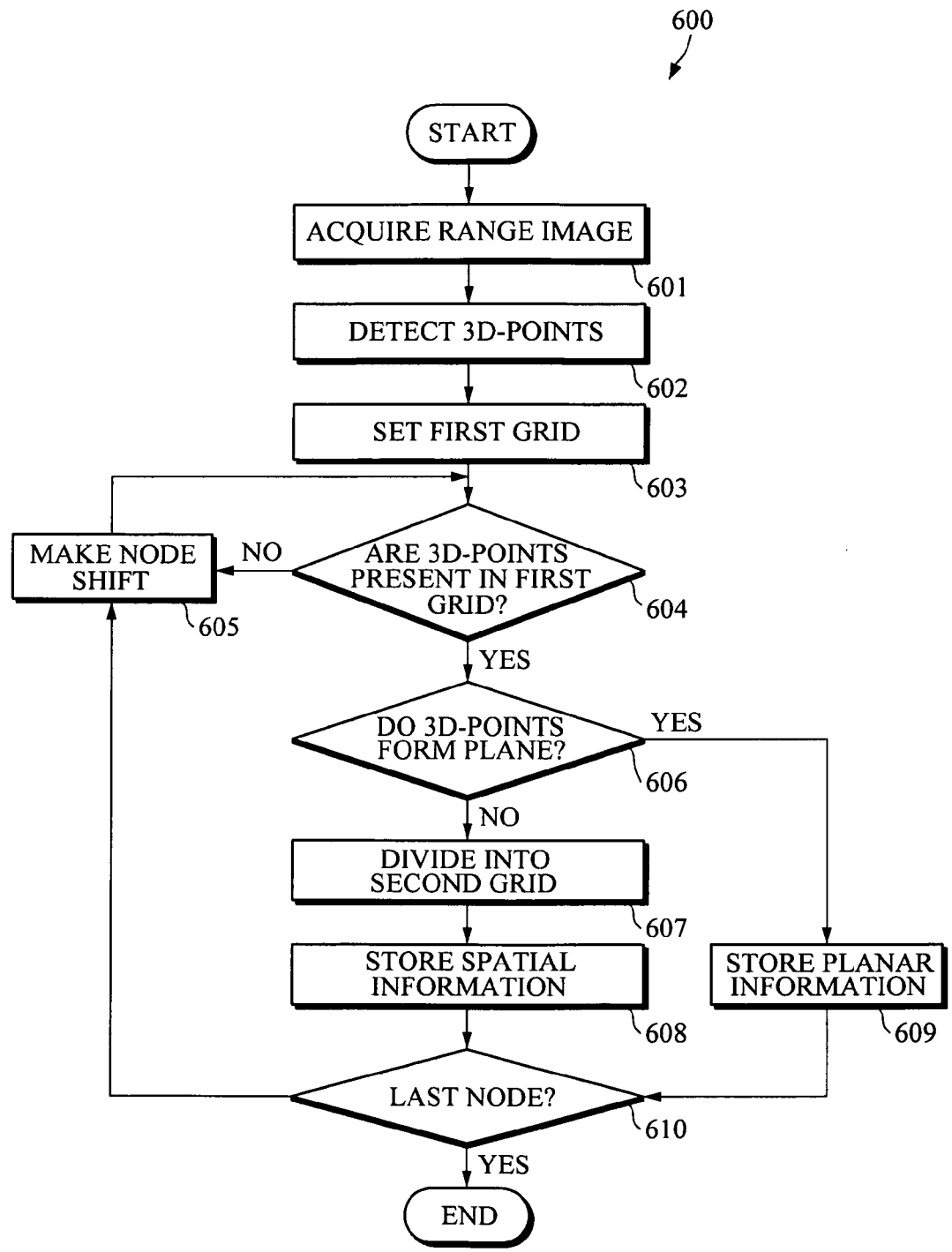
FIG. 6 illustrates a method of generating an octree-based 3D map, according to one or more embodiments.

As illustrated in FIG. 6, the map generating method (600) begins with acquiring a range image (610). As only an example, as illustrated in FIG. 5A, the range image acquisition unit 401 may acquire range data by use of a 3D distance sensor or acquire a range image by use of a stereo camera.

Then, the acquiring of the range image of the map generating method (600) is followed by detecting 3D points from the acquired range image (602). For example, as illustrated in FIG. 5B, the point detection unit 402 may detect 3D points corresponding to an object present in a space of the acquired range image.

Then, the detecting of the 3D points of the map generating method (600) is followed by setting a first grid in a space taken by the detected points (603). As only an example, as illustrated in FIG. 5C, the grid setting unit 403 may represent the detected points using several numbers of initial grids.

Thereafter, the setting of the first grid of the map generating method (600) is followed by determining the presence of 3D points in the first grid (604).

If 3D points are not present in a predetermined first grid, a shift to a next node is made (605). The next node denotes another first grid adjacent to the predetermined first grid. For example, when a space is divided into initial eight grids, a node shift involves moving from a first initial grid to a second initial grid.

If 3D points are present in the first grid, it is determined whether the 3D points form a plane (606). For example, the grid partitioning unit 404 may determine the presence of 3D points satisfying a predetermined plane equation by use of location information or position coordinates of 3D points. Alternatively, if 3D points forming a plane and 3D points not forming a plane are present in the first grid, the first grid is regarded as not having three points forming a plane.

If the 3D points in the first grid do not form a plane, the first grid is subdivided into a second grid, that is, a lower grid (607), and stores spatial information about the second grid (608). For example, as illustrated in FIG. 5D, the grid partitioning unit 404 divides the fourth initial grid 534 including the spherical object 501 into eight sub-grids 550, and stores position coordinates of the center of the initial grid 534 and the sub-grids 550, the size of the initial grid 534 and the sub-grids 550 and link information about the initial grid 534 and the sub-grids 550. If the 3D points in the first grid form a plane, the grid partitioning unit 404 stores information about the corresponding plane without dividing the first grid into the second grid (609). For example, as illustrated in FIG. 5D, the grid partitioning unit 404 does not divide the seventh initial grid 537 including the planar object 502 and stores parameters of a plane equation for the plane 540 or position coordinates of 3D points forming the plane 540.

After that, the storing of spatial information or planar information of the map generating method (600) is followed by determining whether a current grid is the last node (610). If the current node is not the last node, a shift to a next node is made (605). If the current node is the last node, the map generating method is completed.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus generating an octree based three-dimensional (3D) map, the apparatus comprising:
    a point detection unit configured to detect a plurality of points each having 3D location information from a range image;
    a grid setting unit configured to represent the plurality of points using at least one first grid; and
    a grid partitioning unit configured to subdivide the at least one first grid into at least one respective second grid based on a determination of whether respective points positioned in the at least one first grid form a plane.

2. The apparatus of claim 1, wherein the grid partitioning unit determines whether points in a first grid form a plane, stores planar information about the plane without subdividing the first grid into at least one second grid when the determination indicates that the points in the first grid form a plane, and subdivides the first grid into the at least one second grid and stores spatial information about the at least one second grid when the determination indicates that the points in the first grid do not form a plane.

3. The apparatus of claim 2, wherein the grid partitioning unit determines whether the points in the first grid form a plane by use of range information or position coordinates of the points in the first grid.

4. The apparatus of claim 2, wherein the planar information includes at least one of parameters of a plane equation on the plane, boundary information of the plane, and position coordinates of the points in the first grid forming the plane.

5. The apparatus of claim 2, wherein the spatial information includes at least one of position coordinates of a center of the at least one second grid, a size of the at least one second grid, information about a lower grid, and position coordinates of respective points in the at least one second grid.

6. The apparatus of claim 1, further comprising:
    a range image acquisition unit configured to acquire the range image; and
    a map storage unit configured to store the planar information and the spatial information.

7. The apparatus of claim 1, wherein the at least one second grid is a lower grid or a sub-grid of a respective first grid, and has a size smaller than the respective first grid.

8. A method of generating an octree based three-dimensional (3D) map, the method comprising:
    acquiring a range image;
    detecting a plurality of points each having 3D location information from the range image;
    representing the plurality of points using at least one first grid;
    determining whether respective points in the at least one first grid form a plane; and
    storing planar information about the plane when the determination indicates that the respective points in the at least one first grid form a plane, and subdividing the at least one first grid into at least one respective second grid and storing spatial information about the at least one respective second grid when the determination indicates that the respective points in the at least one first grid do not form a plane.

9. The method of claim 8, wherein the range image is range data in which each position of an image is represented by range information.

10. The method of claim 8, wherein the determining of whether the respective points form the plane comprises obtaining a predetermined plane equation by use of range information or position coordinates of the respective points in the at least one first grid.

11. The method of claim 8, wherein the planar information includes at least one of parameters of a plane equation on the plane, boundary information of the plane, and position coordinates of the respective points in the at least one first grid forming the plane.

12. The method of claim 8, wherein the spatial information includes at least one of position coordinates of a center of the at least one respective second grid, a size of the at least one respective second grid, information about a lower grid, and position coordinates of respective points in the at least one respective second grid.

* * * * *